United States Patent

Fitzhugh

[15] 3,640,641
[45] Feb. 8, 1972

[54] ADAPTER FOR WORKING IMPLEMENTS

[72] Inventor: Guy D. Fitzhugh, P.O. Box 6053, Pine Bluff, Ark. 71601

[22] Filed: Oct. 10, 1969

[21] Appl. No.: 865,427

Related U.S. Application Data

[63] Continuation-in-part of Ser. No. 660,797, Aug. 15, 1967, Pat. No. 3,472,490.

[52] U.S. Cl. ..................416/62, 416/71, 416/146, 416/170
[51] Int. Cl. ...........................................B01f 7/18
[58] Field of Search..................416/62, 76, 70, 71, 170 HM; 259/DIG. 35

[56] References Cited

UNITED STATES PATENTS

| 2,959,572 | 5/1939 | Starr | 24/255 |
| 3,141,184 | 7/1964 | Notes | 259/DIG. 35 |
| 3,186,020 | 6/1965 | Redfield | 259/DIG. 35 |

FOREIGN PATENTS OR APPLICATIONS

| 248,783 | 2/1948 | Switzerland | 24/255 |
| 1,212,998 | 10/1958 | France | 24/255 |

*Primary Examiner*—Martin P. Schwadron
*Assistant Examiner*—Clemens Schimikowski
*Attorney*—Clarence A. O'Brien and Harvey B. Jacobson

[57] ABSTRACT

An adapter removably attaching working or cleaning implements to a portable, power-driven beater or to a tubular grip handle for alternative powered rotation and manual manipulation. The mounting body of the adapter is held in abutment with the end of the beater shank and is provided with torque transmitting prongs that extend between and axially beyond the beater blades. Cam enlargements on the ends of the prongs releasably hold the adapter on the beater.

6 Claims, 3 Drawing Figures

PATENTED FEB 8 1972
3,640,641
Fig. 1
Fig. 2
Fig. 3
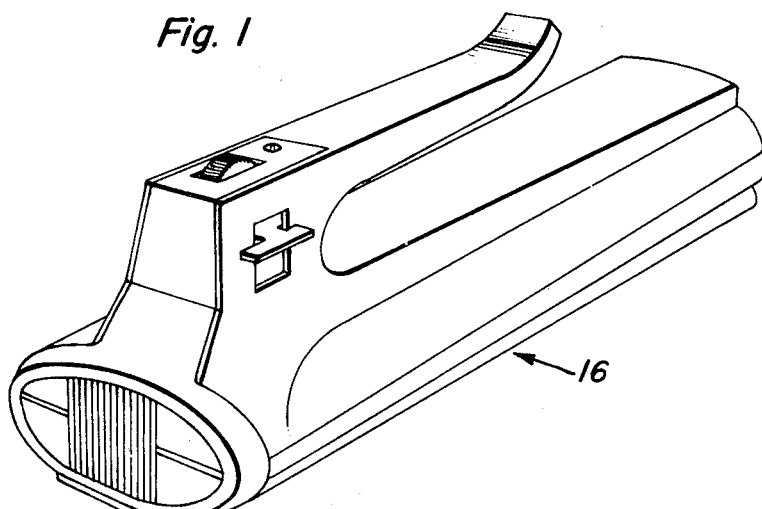
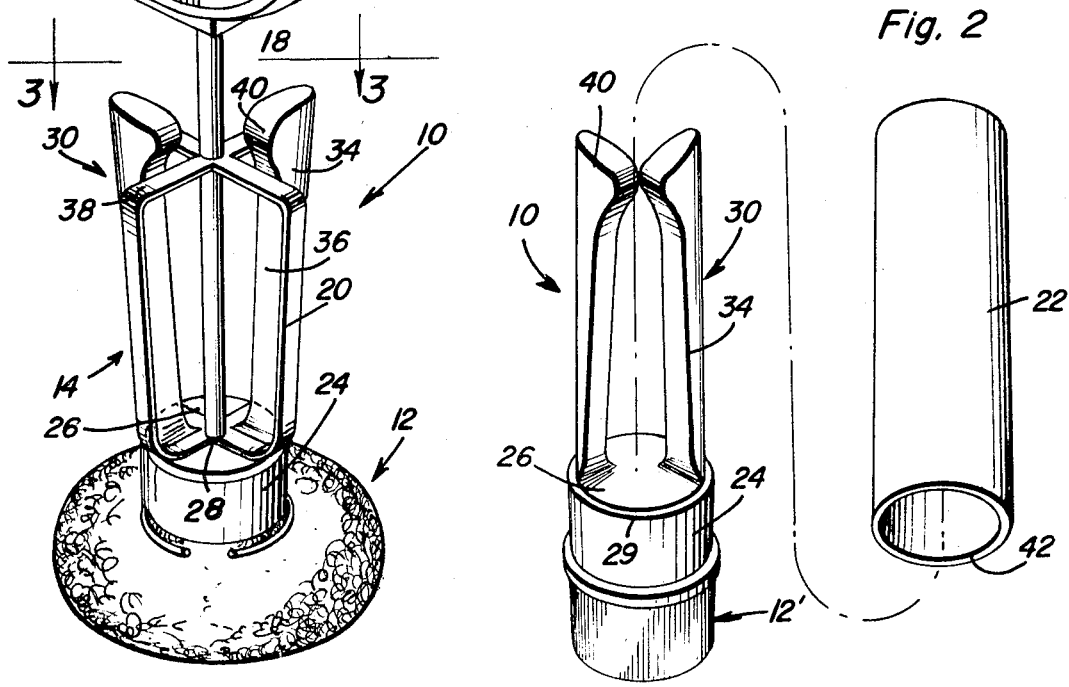
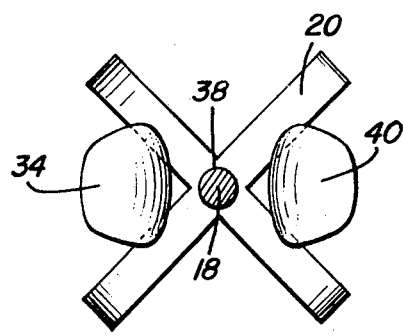
Guy D. Fitzhugh
INVENTOR.
BY Clarence A. O'Brien
and Harvey B. Jacobson
Attorneys

ADAPTER FOR WORKING IMPLEMENTS

This invention relates generally to the attachment of working implements to power driven devices and more particularly to an attachment of working implements to the beater of a portable electric mixer similar to that disclosed in my prior copending application U.S. Ser. No. 660,797, filed Aug. 15, 1967, now U.S. Pat. No. 3,472,490, with respect to which the present application is a continuation-in-part.

The present invention represents an improvement over the mounting adapters disclosed in my prior copending application aforementioned in that it is more easily mounted on and removed from a beater blade assembly and is also more economical in construction.

In accordance with the present invention a mounting adapter is provided having the torque transmitting advantages associated with adapters disclosed in my prior copending application aforementioned. The adapter of the present invention features a relatively rigid, cylindrical body having an end face adapted to abut the end of the beater and from which at least two axially elongated prongs extend. The prongs are dimensioned so as to fit between radially extending blades of a beater in order to transmit torque to the mounting body and the working implement attached thereto. The torque transmitting prongs extend axially beyond the length of the blade so as to engage the blades at both ends where they are attached to the beater shank. The adapter is releasably held in abutment with the beater by cam enlargements that project radially inwardly to engage the beater blades axially spaced from the end of the beater shank.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a typical portable power operated mixer having a cleaning implement mounted on its beater by an adapter constructed in accordance with the present invention.

FIG. 2 is a perspective view showing the disassembled components of an adapter assembly removed from a beater with which it is usually associated.

FIG. 3 is a transverse sectional view taken substantially through a plane indicated by section line 3—3 in FIG. 1.

Referring now to the drawings in detail, it will be observed from FIG. 1 that the adapter of the present invention generally referred to by reference numeral 10 is utilized to attach a working implement generally referred to by reference numeral 12 to a mixing beater 14 associated with a portable type of power mixer 16. The beater 14 is a well-known type commonly available having an elongated shank 18 adapted to be removably inserted into the mixer 16 for powered rotation and having a plurality of curved beater blades 20 connected at spaced locations to the shank 18. The working implement 12 is removably secured to the adapter 10 which in turn is mounted on the beater in order to transmit powered rotation to the working implement. Various types of implements may be carried or mounted on the adapter in addition to the implement 12 such as the implement 12' illustrated in FIG. 2. Also, the implement may be manually manipulated by removal of the adapter 10 from the beater and insertion thereof into a plastic tubular grip handle 22 as illustrated in FIG. 2.

The adapter 10 comprises a cylindrical mounting body 24 made of a suitable rigid material such as plastic. The mounting body is provided with an abutment end face 26 adapted to engage the beater at one end 28 of the shank 18 to which the beater blades 20 are connected. The end face is bordered by a circumferential seating rim 29.

At least two torque transmitting prongs 30 extend axially from the end face 26 of the mounting body 24 in 180° angularly spaced relation to each other relative to the rotational axis of the shank 18. Each prong is provided with a radially outer surface 34 and with side surfaces 36 which converge radially inwardly so as to engage the sides of the adjacent beater blades 20 at the end 28 of the beater shank and at a location 38 spaced therefrom where the blades are also attached to the shank. In view of the engagement of the blades at spaced locations 28 and 38, torque will be transmitted to the adapter with a minimum amount of blade deformation.

In order to releasably hold the adapter mounted on the beater, the prongs are formed with cam enlargements 40. The enlargements project radially inward toward confronting apex portions from the radially outer surfaces 34 of the prongs. Also, the cam enlargements 40 are axially spaced from the end face 26 of the mounting body 24 a distance greater than the axial length of the beater blades 20. It will be apparent therefore, that the adapter is mounted by pushing the ends of the prongs 30 between the beater blades 20 causing the cam enlargements to laterally deflect the elastically deformable prongs until they engage the blades at the location 38 as shown in FIG. 1 holding the prongs in a laterally deformed state. When the adapter is removed from the beater, the cam enlargements 40 abut each other to space the prongs in their undeformed state as shown in FIG. 2.

In the undeformed state of the prongs as shown in FIG. 2, the apex portions of the enlargements 40 abut and the radially outer surfaces 34 form portions of a substantially cylindrical surface dimensioned for enclosure within the tubular handle 22. The circular edge 42 of the handle 22 is adapted to be seated on the rim 29 of the mounting body 24 so that the outer surfaces of the handle and the body are flush. The tubular handle 22 therefore protectively encloses the prongs 30 which form a rigid core in view of the abutment of the enlargements 40 so as to enable the adapter to be used as a hand implement.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a power driven beater having an elongated shank and a plurality of blades connected to the shank at one end and at a location axially spaced therefrom, an adapter for attaching work implements to the beater comprising a mounting body having an end face, at least two elastically deformable prongs extending from the body adapted to be received between the blades, and cam means mounted on the prongs and engageable with the blades on a side of said location on the shank remote from said one end of the shank for holding the end face of the mounting body in abutment with said one end of the shank, said cam means comprising enlargements formed on the prongs projecting radially inward therefrom and axially spaced from the end face of the body a distance greater than the axial length of the blades.

2. The combination of claim 1 wherein said enlargements abut each other in the undeformed state of the prongs.

3. The combination of claim 1 wherein said prongs have radially outer faces and converging sides, the radially outer faces forming portions of a substantially cylindrical surface in an undeformed state of the prongs and said converging sides being engageable with the blades in a laterally deformed state of the prongs.

4. The combination of claim 3 wherein said enlargements abut each other in the undeformed state of the prongs.

5. In combination with a beater blade assembly having a predetermined longitudinal dimension, an adapter comprising a mounting body adapted to abut the beater blade assembly, at least two elastically deflectable prongs extending longitudinally from the body, and enlargements formed on said prongs projecting radially inwardly toward confronting portions spaced longitudinally from the body a distance greater than said predetermined longitudinal dimension of the beater blade assembly, said enlargements adapted to engage the beater blade assembly with the prongs deflected radially outward to thereby hold the adapter on the blade assembly.

6. The combination of claim 5 wherein said confronting portions of the enlargements abut each other in the undeformed state of the prongs to form a rigid core for a tubular handle.

* * * * *